US006466956B1

(12) United States Patent
Cho et al.

(10) Patent No.: US 6,466,956 B1
(45) Date of Patent: Oct. 15, 2002

(54) METHOD FOR DISTRIBUTING AND COLLECTING ELECTRONIC WORKSHEETS VIA A NETWORK

(75) Inventors: Jeongyul Cho; Takashi Kobayashi, both of Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/234,707

(22) Filed: Jan. 21, 1999

(30) Foreign Application Priority Data

Jan. 23, 1998 (JP) .......................................... 10-011207

(51) Int. Cl.⁷ .............................................. G06F 15/00
(52) U.S. Cl. ........................................ 707/531; 345/751
(58) Field of Search ................................ 707/531, 503; 345/751, 753, 758

(56) References Cited

U.S. PATENT DOCUMENTS

| | | | | |
|---|---|---|---|---|
| 5,312,478 A | * | 5/1994 | Reed et al. | 707/503 |
| 6,006,242 A | * | 12/1999 | Poole et al. | 707/531 |
| 6,157,934 A | * | 12/2000 | Khan et al. | 707/503 |
| 6,157,935 A | * | 12/2000 | Tran et al. | 707/503 |
| 6,292,811 B1 | * | 9/2001 | Clancey et al. | 707/503 |

FOREIGN PATENT DOCUMENTS

JP  8-249308  9/1996

* cited by examiner

Primary Examiner—Joseph H. Feild
Assistant Examiner—Maikhanh Nguyen
(74) Attorney, Agent, or Firm—Mattingly, Stanger & Malur, P.C.

(57) ABSTRACT

In a system where a subject management server, a requester client, and a plurality of replier clients are connected via a network, when the requester client sends a subject modification request to a worksheet already defined: in the subject management server, a subject modifying module of the subject management server modifies a part of a corresponding file and, by referencing a status management table containing information about whether or not each replier has already replied, modifies a corresponding part of a replied worksheet file of the replier. When accessed by one of the plurality of replier clients, a reply managing module of the subject management server references the status management table and, depending upon whether or not the replier has already replied, sends a not-yet-replied worksheet file or a replied worksheet file. The reply managing module also registers a file or overwrites an existing file depending upon whether or not the reply from the replier is the first reply.

20 Claims, 13 Drawing Sheets

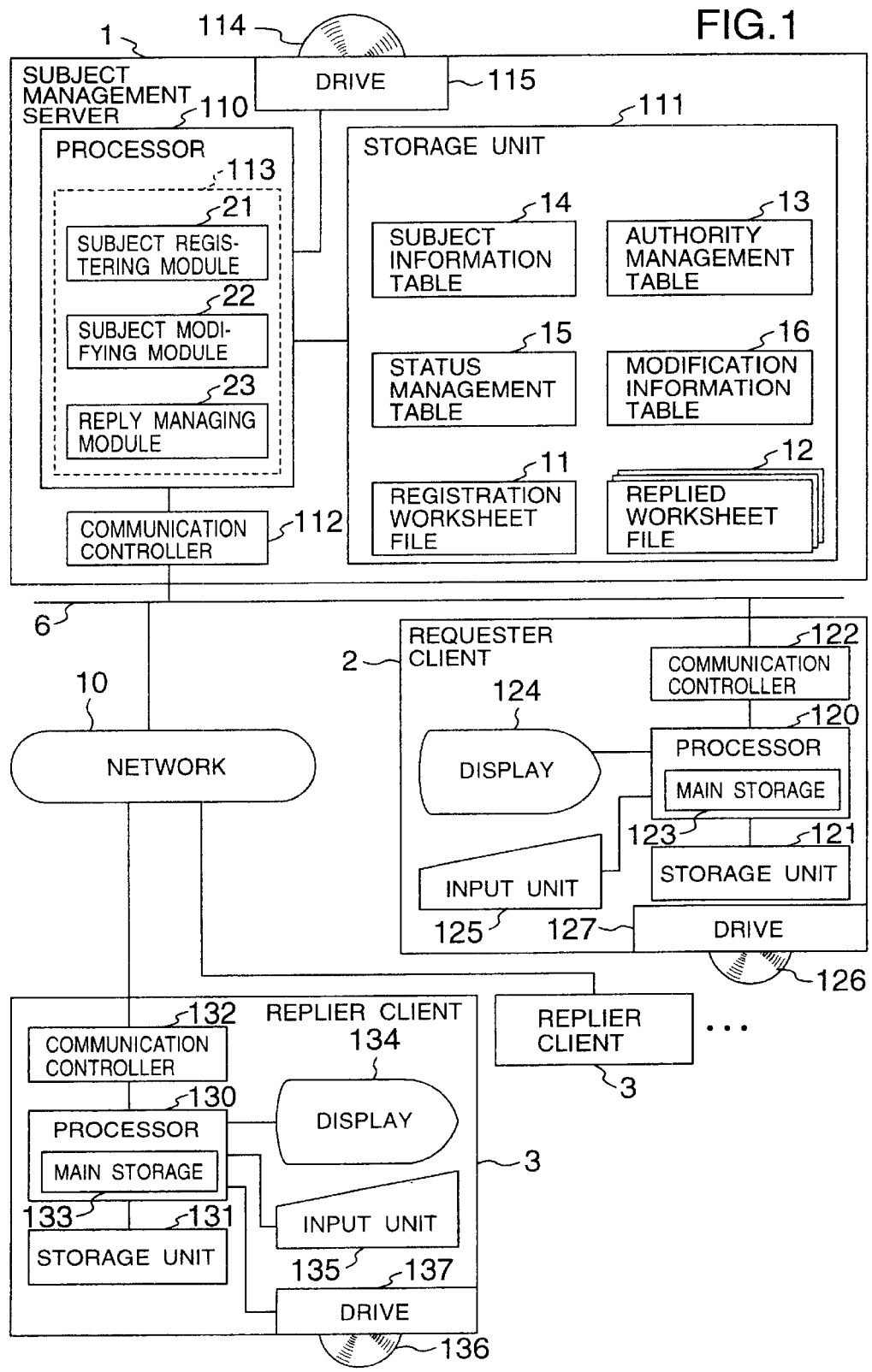

FIG.2

13 : AUTHORITY MANAGEMENT TABLE

| USER ID | USER NAME | PASSWORD | AUTHORITY |
|---|---|---|---|
| AN1234 | TARO TANAKA | TA21R | ADMINISTRATOR |
| AN4321 | HANAKO TANAKA | HAK001 | NON-ADMINISTRATOR |
| BS12AC | JIRO YAMADA | ZYD6642 | |
| ... | ... | ... | ... |
| 201 | 202 | 203 | 204 |

FIG.3

14 : SUBJECT INFORMATION TABLE

| SUBJECT ID | SUBJECT TITLE | REPLY DEADLINE | WORKSHEET STORAGE PATH | WORKSHEET FILE NAME | CREATOR NAME |
|---|---|---|---|---|---|
| AN0001 | OPINION ON SYSTEM USAGE | 97/08/31 | C:\SUBJECT\QUESTIONNAIRE | OPINION-SURVEY.DOC | TARO TANAKA |
| AN0002 | H9-SECOND-TERM BUDGET (INDIRECT COST) PREPARATION | 97/07/31 | C:\BUDGET\H9_SECOND-TERM | INDIRECT-COST.XLS | HANAKO TANAKA |
| AN0003 | QUESTIONNAIRE ON NEW SERVICES | 97/09/30 | C:\REQUESTED-SUBJECT\QUESTIONNAIRE | NEW-SERVICES.XLS | JIRO YAMADA |
| ... | ... | ... | ... | ... | ... |
| 301 | 302 | 303 | 304 | 305 | 306 |

FIG.4

15 : STATUS MANAGEMENT TABLE

| SUBJECT ID | REPLIER ID | REPLIER NAME | STATUS | REPLY FILE STORAGE PATH | REPLY FILE NAME | DOWNLOAD FLAG |
|---|---|---|---|---|---|---|
| AN0001 | CZ00023 | JIRO KIMURA | UNREAD | — | — | 1 |
| AN0001 | CZ96313 | TARO SAKAI | READ | — | — | 1 |
| AN0001 | AX04823 | HANAKO OGOSHI | REPLIED | C:¥REPLY¥ OPINION-SURVEY | AX04823.doc | 1 |
| AN0001 | WY69142 | JUNKO SUZUKI | READ | C:¥REPLY¥ OPINION-SURVEY | WY69142.doc | 0 |
| AN0001 | WR45823 | REIKO TAKEUCHI | REPLIED | C:¥REPLY¥ OPINION-SURVEY | WR45823.doc | 0 |
| ... | ... | ... | ... | ... | ... | ... |
| 401 | 402 | 403 | 404 | 405 | 406 | 407 |

FIG.5

16 : MODIFICATION INFORMATION TABLE

| SUBJECT ID | SUBJECT TITLE | MESSAGE CONTENT |
|---|---|---|
| AN0001 | OPINION SURVEY OF SYSTEM USAGE | QUESTION 3 HAS BEEN CHANGED. PLEASE REPLY TO IT AGAIN. |
| ... | ... | ... |
| 501 | 502 | 503 |

FIG.6

SUBJECT REGISTRATION — 600

- SUBJECT TITLE: OPINION SURVEY OF SYSTEM USAGE — 601
- DISTRIBUTION FILE: C:¥REQUESTED-SUBJECT¥QUESTIONNAIRE¥OPINION-SURVEY.DOC — 602
- DISTRIBUTION DESTINATION — 603
  - JIRO KIMURA (CZ00023)
  - TARO SAKAI (CZ96313)
  - HANAKO OGOSHI (AX04823)
  - JUNKO SUZUKI (WY69142)

1997 YEAR 08 MONTH 31 DAY — 604

[REGISTER] 605    [END] 606

FIG.7

REGISTERED SUBJECT LIST — 700

| SUBJECT TITLE | REPLY DEADLINE | WORKSHEET FILE NAME |
|---|---|---|
| OPINION SURVEY OF SYSTEM USAGE | 97/08/31 | OPINION-SURVEY.DOC |
| H9-SECOND-TERM BUDGET (INDIRECT COST) PREPARATION | 97/07/31 | INDIRECT-COST.XLS |
| QUESTIONNAIRE ON NEW SERVICES | 97/09/30 | NEW-SERVICES.DOC |
| ... | ... | ... |

701   702   703

[MODIFY] 704   [END] 705

FIG.9

REQUESTED SUBJECT LIST  ~900

| SUBJECT TITLE | REPLY DEADLINE | WORKSHEET FILE NEME | CREATOR | REPLY | DOWN-LOAD |
|---|---|---|---|---|---|
| OPINION SURVEY OF SYSTEM USAGE | 97/08/31 | OPINION-SURVEY. DOC | TARO TANAKA | NOT REPLIED | NOT DOWN-LOADED |
| H9-SECOND-TERM BUDGET (INDIRECT COST) PREARATION | 97/07/31 | INDIRECT-COST. XLS | JIRO YAMADA | REPLIED | NOT DOWN-LOADED |
| QUESTIONNAIRE ON NEW SERVICES | 97/09/30 | NEW-SERVICES. DOC | SABURO TANAKA | NOT REPLIED | DOWN-LOADED |
| ... | ... | ... | ... | ... | ... |

901  902  903  904  905  906

[ DOWNLOAD ]  [ END ]
   907          908

FIG.10

MODIFICATION MESSAGE  ~1000

MODIFIED SUBJECT :
    OPINION SURVEY OF SYSTEM USAGE
MESSAGE FROM REQUESTER :
    QUESTION 3 HAS BEEN CHANGED.
    PLEASE REPLY TO THE QUESTION AGAIN.

[ CANCEL ]
    1001

FIG.16

| | A | B | C | D |
|---|---|---|---|---|
| 1 | ITEM NAME | UNIT PRICE | QUANTITY | AMOUNT |
| 2 | FD | | 5000 | |
| 3 | CD-ROM | | 4000 | |
| 4 | DVD-ROM | | 3000 | |
| 5 | | | TOTAL | |

1700 WORKSHEET CONTENT KMODIFICATION SCREEN

WORKSHEET FILE NAME : ESTIMATE.ELS

BEFORE-MODIFICATION CONTENT (1701):
D5=D2+C3+D4

AFTER-MODIFICATION CONTENT (1702):
D5=D2+D3+D4

MESSAGE (1703):
THE TOTAL CALCULATION FORMULA IS INCORRECT.
BE AWARE WHEN USING FILLED-IN SETIMATES.

[REGISTER] 1704   [END] 1705

METHOD FOR DISTRIBUTING AND COLLECTING ELECTRONIC WORKSHEETS VIA A NETWORK

BACKGROUND OF THE INVENTION

The present invention relates to a method for distributing and collecting electronic worksheets via a network. The present invention relates particularly to a method for distributing and collecting electronic worksheets while allowing a requester to modify an electronic worksheet for each replier in any point according to the worksheet completion progress status, from the time the worksheet is distributed to the replier to the time after the worksheet is filled in by the replier.

Electronic worksheets have been used to exchange transaction data among companies via networks or to exchange business data among personnel in the same company. Electronic worksheets include those fixed-format sheets designed for repliers to fill in, such as questionnaire worksheets, company budgeting documents, and fixed property investigation sheets. These electronic worksheets are distributed from a requester to a plurality of repliers. After fill in by the repliers, the electronic worksheets are collected for reference by the requester. Thus, a survey with the use of electronic worksheets significantly increases business productivity, because it is done quickly through network data transmission and computer processing. For example, an electronic questionnaire system, disclosed in JP-A-8-249308, comprises a questionnaire requesting unit for creating questionnaires, sending questionnaires to repliers, and receiving results, a questionnaire management unit for managing questionnaires, and a questionnaire receive/reply management unit for receiving questionnaire and returning replies. The system automatically distributes prepared questionnaires to repliers; the system also automatically returns questionnaire replies, created by repliers, back to the questionnaire requester. The system thus reduces the load of the requester and repliers involved in distributing and returning questionnaires.

SUMMARY OF THE INVENTION

However, when a part of an electronic worksheet must be changed after worksheet distribution, the electronic worksheet system according to JP-A-8-249308 requires the requester to modify a portion of contents of the worksheet, specify repliers again, and redistribute modified worksheets to the repliers. In this case, when there are many distribution destinations, or repliers, redistribution is cumbersome. In addition, the requester must inform all repliers, via e-mail or telephone, that the worksheet has been modified. This not only increases the load of the requester but also sometimes fails to inform all repliers of the modification because there is a possibility that some repliers do not open the e-mail. On the other hand, repliers who have already filled in their worksheets must download worksheets again, complete them again, and. return them to the requester. This also increases the load of repliers.

In fact, when conducting a questionnaire on opinions, new products, or services, the reaction of repliers is unknown at the time the questionnaire is prepared. sometimes, the questionnaire is re-prepared by examining returned replies. Another problem is that worksheets such as those prepared for indirect tasks, including budgeting, sometimes contain formulas for automatic calculation and summation. If an error is found in formulas after creating and distributing worksheets, the requester must modify already-distributed worksheets.

As described above, when the contents of a worksheet are modified, the electronic worksheet system according to JP-A-8-249308 requires the requester to redistribute the modified worksheet and inform the repliers of the fact that the worksheet has been modified. Also, the system requires the repliers to fill in their worksheets again. In particular, when the worksheet is a questionnaire, some repliers do not download the modified worksheet again or, even if they download the modified worksheet, they may not fill it in again, resulting in a low collection ratio.

It is an object of the present invention to provide a method for distributing and collecting an electronic worksheet which reduces the load of a requester and repliers even when the electronic worksheet is modified or changed and, at the same time, increases the worksheet collection ratio.

It is another object of the present invention to provide a method for distributing and collecting electronic worksheets which sends a modification message when the replier is going to fill in the worksheet. This keeps the replier well informed of modification in the worksheet and therefore ensures a high worksheet collection ratio.

The present invention may be implemented by a method for distributing and collecting electronic worksheets, comprising the steps of modifying a part of the electronic worksheet stored in the first storage means in response to a modification request from the requester;

modifying a corresponding part of each of said replied worksheets stored in the second storage means by referencing status information indicating whether or not each replier has replied, said status information being stored in third storage means;

distributing either the replied worksheet stored in the second storage means or the electronic worksheet stored in the first storage means by referencing the information in the third storage means to determine if,the replier has replied; and changing a status to a replied status and, depending upon whether the replied worksheet sent from the replier is a first reply to the electronic worksheet, storing the replied worksheet in the second storage means or overwriting the corresponding replied worksheet. The present invention may also be implemented by a computer program on a computer-readable recording medium which comprises the steps for executing the steps of the method.

In addition, after an electronic worksheet is modified, the method according to the present invention sends a modification message to repliers, who have already replied to the electronic worksheet, when they request for the requested-subject list. This keeps the replier well informed of the worksheet modification and thus increases the worksheet collection ratio.

When the creator, or the requester, registers a worksheet, its distribution destinations are also registered. This means that the requester does not have to re-specify the distribution destinations when the modified worksheet is redistributed. This also eliminates the need for the requester to inform worksheet modification and, in addition, keeps the repliers well informed of the modification, resulting in a quick collection of worksheets.

The present invention is suited for an electronic worksheet system where worksheet distribution destinations are pre-determined and repliers access the system frequently to reply many subjects, rather than for a one-time questionnaire on many and unspecified persons.

It is noted that the term "network" is defined here as not only a communication network but also a path for transferring an electronic medium from a predetermined location to another predetermined location.

BRIEF DESCRIPTION OF THE DRAWINGS

FIG. 1 is a diagram showing the configuration of a worksheet distribution and collection system used in an embodiment.

FIG. 2 is a diagram showing the data configuration of an authority management table 13 used in the embodiment.

FIG. 3 is a diagram showing the data configuration of a subject information table 14 used in the embodiment.

FIG. 4 is a diagram showing the data configuration of a status management table 15 used in the embodiment.

FIG. 5 is a diagram showing the data configuration of a modification information table 16 used in the embodiment.

FIG. 6 is a diagram showing an example of the subject definition screen.

FIG. 7 is a diagram showing an example of the defined-subject list screen.

FIG. 9 is a diagram showing an example of the requested-subject list screen.

FIG. 10 is a diagram showing an example of the modification message screen.

FIG. 16 is a diagram showing another example of a worksheet.

FIG. 17 is a diagram showing an example of the worksheet content modification screen shown in FIG. 16.

DESCRIPTION OF THE PREFERRED EMBODIMENTS

Figure 8:
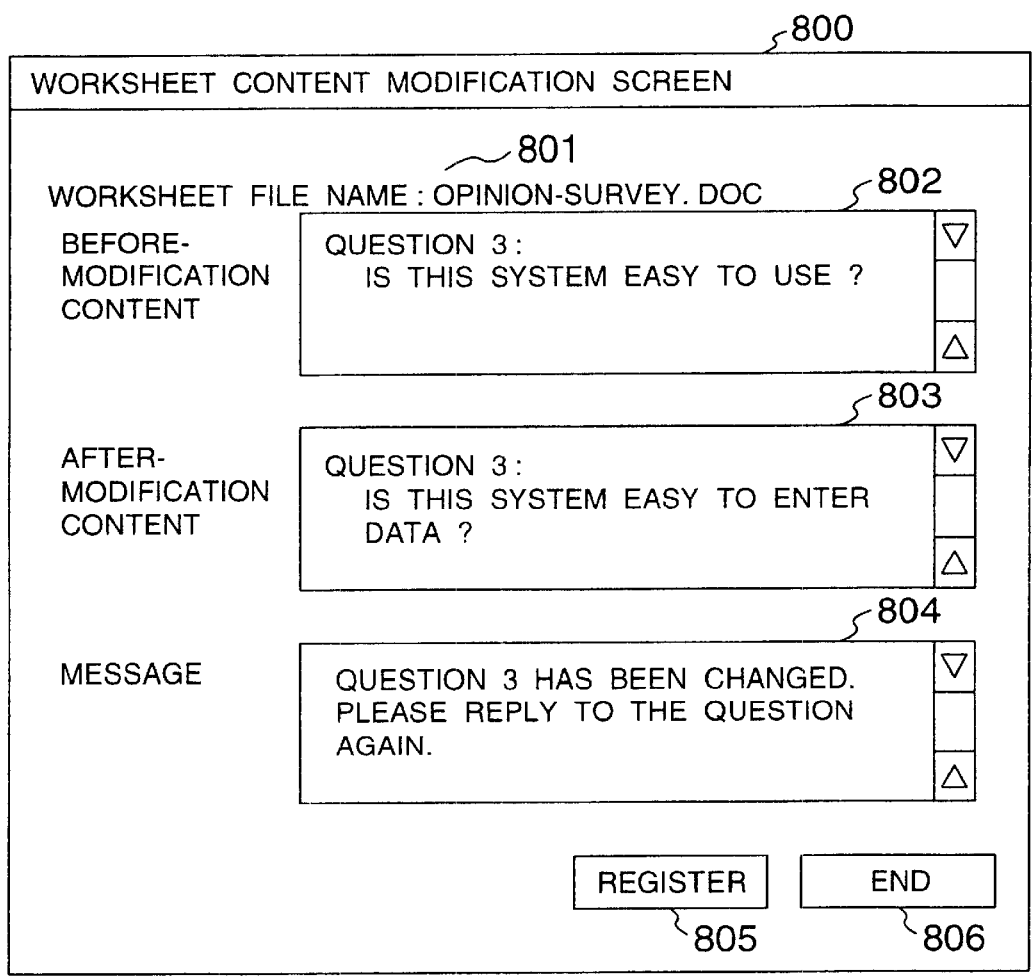
FIG. 8 is a diagram showing an example of the worksheet content modification screen.

An embodiment of the present invention will be described in detail with reference to the drawings.

FIG. 1 is a diagram showing the configuration of a system for distributing and collecting electronic worksheets. The system comprises a subject management server 1 which manages worksheet subjects, a requester client 2 which defines and modifies subjects, and a plurality of replier clients 3 each downloading a worksheet and entering a reply to the downloaded worksheet. The subject management server 1 and the plurality of replier clients 3 are connected by a network 10. Although the subject management server 1 and each requester client 2 are connected by a transmission line 6 such as one used in a LAN, they may be connected via the network 10.

The subject management server 1 is a computer comprising a processor 110, a storage unit 111, and a communication controller 112. The storage unit 111 contains a definition worksheet file 11, a replied worksheet files 12, an authority management table 13, a subject information table 14, a status management table 15, and a modification information table 16. The definition worksheet file 11, created by the requester client 2 and stored in the subject management server 1, contains one definition worksheet for each subject. The replied worksheet file 12 contains worksheets filled in by the replier clients 3. One replied worksheet is stored for each replier who has replied. The authority management table 13 contains login information for each user and authority information indicating whether or not a requester requesting to define or modify a worksheet has authority to do so. The subject information table 14 contains the list of all worksheets stored in the definition worksheet file 11. The status management table 15 contains, for each worksheet subject and for each replier, information indicating whether or not the worksheet is unread, read, or replied and status information indicating whether or not the worksheet is downloaded. A modification information table 16 contains messages to be sent to the replier clients 3 for each modified subject.

A main storage unit 113 in the processor 110 of the subject management server 1 is where application programs of a subject defining module 21, a subject modification module 22, and a reply managing module 23 are executed by the processor 110. These programs, which are stored on a recording medium 114, are read into the main storage unit 113 in the subject management server 1 via a drive 115 for execution.

Upon receiving a subject definition request from the requester client 2, the subject defining module 21 references the authority management table 13 to check the authentication and authority of the user. Then, the subject defining module 21 receives subject information, distribution destination information, and a worksheet, registers the subject information to the subject information table 14, and registers the worksheet to the definition worksheet file 11. In addition, the subject defining module 21 registers the repliers of each distribution destination to the status management table and sets the status to "unread" and "not downloaded".

Upon receiving a subject modification request from the requester client 2, the subject modification module 22 searches the subject information table 14 for the subjects associated with the requester, creates a list of the subjects, and sends the list back to the requester client 2. When receiving modified contents at a portion of a worksheet and a modification message to be issued to the repliers, the subject modification module 22 modifies the definition worksheet file 11 for the specified subject and registers the modification message to the modification information table 16. Then, the subject modifying module 22 searches the status management table 15 for one or more records containing the subject to be modified. For a distribution destination (replier) whose status is "replied", the subject modifying module 22 modifies the replied worksheet file 12 of the replier with the after-modification content; for a distribution destination whose status is "read/replied", the subject modifying module 22 changes its download status to "not downloaded". At this time, the replier's reply in the replied worksheet corresponding to the modified portion is deleted; however, the replier's reply corresponding to the modified portion may not also be deleted.

Upon receiving a login request from a replier client 3, the reply managing module 23 searches the status management table 15 and the subject information table 14 for subjects which are to be distributed to the replier, creates the list of subjects, and sends the list back to the replier client 3 who issued the request. Upon receiving a download request from the replier client 3, the reply man aging module 23 references the status management table 15 to check if the specified subject is "replied." If it is not "replied", the reply managing module 23 sends the definition worksheet file 11 to the replier client 3; if it is "replied", the reply managing module 23 sends the corresponding replied worksheet file 12 to the replier client 3. Upon receiving a filled-in worksheet from the replier client 3, the reply managing module 23 changes the status of the record in the status management table 15 to "replied" and registers the worksheet to the replied worksheet file 12 if the reply is the first reply; if the reply is the second or later reply, the reply managing module 23 updates the corresponding replied worksheet file 12 with the received replied worksheet.

The requester client 2 is a computer, such as a personal computer, comprising a processor 120, a storage unit 121, a communication controller 122, a display 124, and an input unit 125. The program in main storage 123 of the processor 120 reads a worksheet into the storage unit 121 via the input unit 125 and displays the subject definition screen on the display 124. The program then sends subject information, distribution destination information, and a worksheet entered from the input unit 125 to the subject management server 1. The program sends a subject modification request to the subject management server 1, receives the list of defined subjects, and displays it on the display 124. The program also displays worksheet content modification screen on the display 124 and sends the modifications and modification messages entered from the input unit 125 to the subject management server 1. The program is stored on a storage medium 126 and read into the main storage 123, as necessary, via a drive 127. The program may also be stored on a recording medium 114 and read into the main storage 123 via the network 10 for execution.

The replier client 3 is a computer, such as a personal computer, comprising a processor 130, a storage unit 131, a communication controller 132, a display 134, and an input unit 135. The program in main storage 133 of the processor 130 requests the subject management server 1 to send the list of requested subjects, receives it, and displays it on the display 134. Upon receiving a worksheet download request, the program sends the download request to the subject management server 1, stores the received worksheet in the storage unit 131, and displays it on the display 134. When the replier client 3 receivers a reply registration request from the input unit 135, it updates the worksheet in the storage unit 131 and sends the filled-in worksheet to the subject management server 1. The program is stored on a storage medium 136 and is read into the main storage 133, as necessary, via a drive 137. The program may also be stored on a recording medium 114 and read into the main storage 133 via the network 10 for execution.

FIG. 2 is a diagram showing the data structure of the authority management table 13. A record of the authority management table 13 is composed of the following fields: a user ID (identifier) 201, a user name 202, a password 203, and an authority 204. The "authority" distinguishes "administrator" having an authority to make a subject request from "non-administrator" not having an authority to do so.

FIG. 3 is a diagram showing the data structure of the subject information table 14. A record of the subject information table 14 is composed of the following fields: a subject ID 301, a subject title 302, a reply deadline 303, a worksheet storage path 304, a worksheet file name 305, and a creator name 306. The subject ID 301 is the identifier of a subject requested by the requester client 2, the subject title 302 is a title assigned to each subject, and the reply deadline 303 is an deadline before which a filled-in worksheet must be registered to the replied worksheet file 12. The worksheet storage path 304 is the path of an area in which the registered worksheet file is stored within the subject management server 1, and the worksheet file name 305 is the name of the registered worksheet (defined registration worksheet file 11). The creator name 306 is the name of the user who created and registered the subject to the subject management server 1.

FIG. 4 is a diagram showing the data structure of the status management table 15. A record of the status management table 15 is composed of the following fields: a subject ID 401, a replier ID 402, a replier name 403, a status 404, a reply file storage path 405, a reply file name 406, and a download flag 407. The subject ID 401 is the identifier of a subject requested by the requester client 2. The replier ID 402 is the identifier of a replier who will reply, or has replied, to the subject. This is a user ID stored in the authority management table 13. The replier name 403 is the name of a replier corresponding to the replier ID 402. The status 404 indicates whether or not the replier has accessed and downloaded the requested subject or whether or not the replier has filled in the worksheet and returned it to the requester. The status is one of the following three: "unread" indicating that the replier has not yet accessed the requested subject, "read" indicating that the replier has downloaded the worksheet file onto the replier client 3, and "replied" indicating that the replier has filled in the worksheet and registered it to the subject management server 1. The reply file storage path 405 is the storage path of the replied worksheet file 12 within the subject management server 1. It indicates where the worksheet file, filled in and sent by the replier, is stored within the subject management server 1. The reply file name 406 is the name of the replied worksheet file 12. The reply file storage path 405 is generated from the worksheet file name of the subject with the corresponding subject ID in the subject information table 14. The reply file name 406 is generated from the replier ID 402 to make the file name unique. The download flag 407 is a flag indicating whether or not the replier has downloaded the definition worksheet file 11 of the subject. For example, the flag is "1" before the replier downloads the definition worksheet file 11; the flag is set to "0" when the replier downloads it. When the worksheet is modified and therefore the definition worksheet file 11 is modified, the flag is set to "1". When the replier downloads the modified worksheet, the flag is set to "0".

FIG. 5 is a diagram showing the data structure of the modification information table 16. A record of the modification information table 16 is composed of the following fields: a subject ID 501, a subject title 502, and a message content 503. The subject ID 501 is the identifier of a requested subject, the subject title 502 is the title of the subject, and the message content 503 is a message to be sent from the requester to a replier, who has already replied, when the message has been modified.

FIG. 6 is a diagram showing an example of a subject definition screen 600 displayed on the display 124 of the requester client 2. The screen has a subject title entry area 601, a distribution file name entry area 602, a distribution destination entry area 603, and a reply deadline entry area 604. The distribution file name entry area 602 is an area where the path name of the worksheet to be distributed to the repliers and its file name are entered. They are the name of the worksheet file created on the storage unit 121 of the requester client 2 and its path name. The distribution destination entry area 603 is an area where the names and IDs of the repliers, to which the worksheet is to be distributed in order to get a reply, are entered. A "Register" button 605 is used to define and register the subject to the subject management server 1, and an "End" button 606 is used to end the definition processing, close the definition screen, and move to the log-out procedure. In the description, it is assumed that the worksheet to be distributed is already created by the creator using, for example, a word processing program.

FIG. 7 is a diagram showing an example of a registered subject list screen 700 displayed on the display 124 of the requester client 2. Registered subjects displayed on this screen are subjects which were registered and which may be modified by the requester. For each subject, a subject title 701, a reply deadline 702, and a worksheet file name 703 are displayed. The worksheet file name 703 is the name of a worksheet file stored on the storage unit 121 of the requester client 2. It matches the name of the corresponding worksheet file stored in the subject management server 1. When the requester selects the worksheet file name of a subject, the requester client 2 opens the specified worksheet file. This screen may also be used by the requester to check the contents of a worksheet. A "Modify" button 704 is used to specify modification. When the "Modify" button 704 is pressed with a subject selected, a worksheet content modification screen (FIG. 8) is displayed for the selected subject. An "End" button 705 is used to close the registered subject list screen after subject modification.

FIG. 8 is a diagram showing an example of a worksheet content modification screen 800 displayed on the display 124 of the requester client 2. A worksheet file name 801 indicates the name of the worksheet file to be modified. The file name is designated, the corresponding worksheet file in the requester client 2 is opened. A before modification content entry area 802 is an area in which data to be modified is entered. A part of the worksheet displayed on the display 124 may be cut and copied to this area. An after-modification content entry area 803 is an area in which modification data for the before-modification content is entered. The before-modification content data may be copied to this area, and then the copied data may be modified in this area. A message entry area 804 is an area in which a message informing the replier of the modification is entered. A modification message may be created automatically by the subject management server 1 according to the modification content. A Register button 805 is used to register the data and the message, entered on this screen, to the subject management server 1. An "End" button 806 is used to close the worksheet content modification screen and to return to the registered subject list screen.

FIG. 9 is a diagram showing an example of a requested subject list screen 900 displayed on the display 134 of the replier client 3. Requested subjects are those subjects the requester is requested to reply. For each subject, a subject title 901, a reply deadline 902, a worksheet file name 903, a creator name 904, a reply status 905, and a download status 906 are displayed. The reply status 905 indicates whether or not the replier client 3 has replied to the subject. The download status 906 indicates whether or not the replier client 3 has downloaded the worksheet of the subject. When the replier specifies the name of the worksheet file of a subject that has been downloaded, the replier client 3 opens the specified worksheet. A "Download" button 907 is used to download a worksheet file. Pressing this button with one of the subjects selected causes the replier client 3 to request the subject management server 1 to download the selected subject. An "End" button 908 is used to close the requested subject list screen. Note that the requester may download the same file any number of times.

FIG. 10 is a diagram showing an example of a modification message displayed on the display 134 of the replier client 3. A modification message is composed of the title of a subject and a message from the requester. A "Cancel" button is used to close the modification message window.

Figure 11:
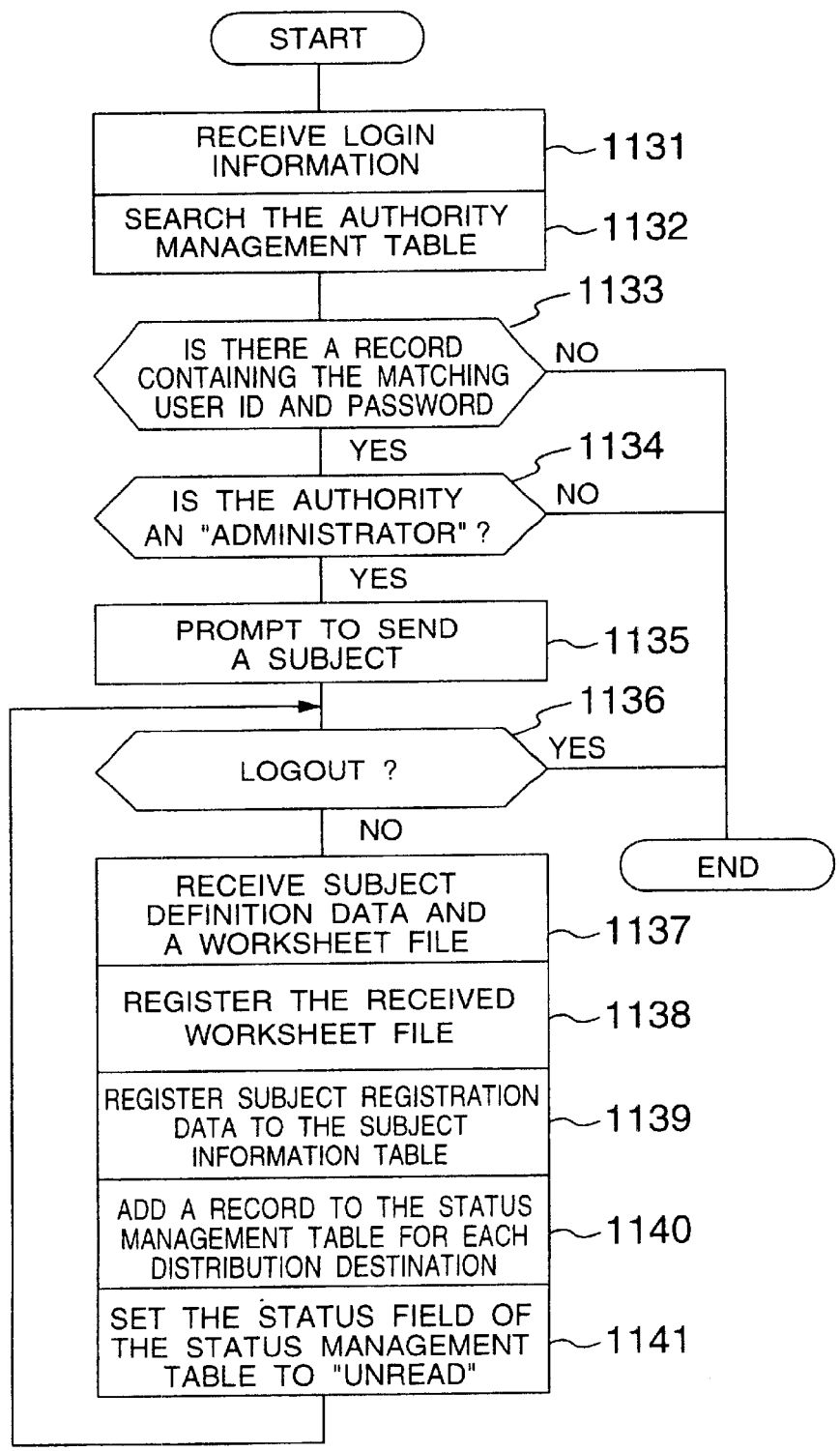
FIG. 11 is a flowchart showing the processing flow of a subject defining module 21 used in the embodiment.

FIG. 11 is a flowchart showing the processing flow of the subject registering module 21. When a subject registration request is entered from the input unit 125 of the requester client 2, the requester client 2 sends login information, composed of a user ID and a password, to the subject registering module 21 to log into it. The subject registering module 21 receives this login information (step 1131) and searches (step 1132) the authority management table 13 for a record containing the received user ID and the password (step 1133). When the authority management table 13 contains a record containing the matching user ID and the password, the subject registering module 21 checks if the authority is an "administrator" (step 1134). If the authority is an "administrator", the subject registering module 21 prompts the requester client 2 to send a subject to the subject management server 1 (step 1135). Upon receiving this prompt, the program running in the requester client 2 displays the subject registration screen 600 on the display 124. When the requester enters necessary data and presses the "Register" button 605, the requester client 2 sends the entered subject registration data and the content of the worksheet file to the subject management server 1.

Unless a log-out request is entered from the requester client 2 (NO in step 1136), the subject registering module 21 receives subject registration data and a worksheet file (step 1137) and registers the received worksheet file to the registration worksheet file 11 under the specified file name (step 1138). The subject registering module 21 then assigns a unique subject ID to this subject and stores subject data, except distribution destination data, into the subject information table 14 (step 1139). The module stores the user name, stored in the authority management table 13, into the "creator name" field of the subject information table 14. The module then adds the subject ID, the replier ID, and replier name to the status management table 15 for each distribution destination (step 1140). Next, the module sets the status field of each added record to "unread", and sets the download flag to "1" (step 1141), and then passes control to step 1136. At this time, the reply file storage path field and the reply file name field of the added record are left blank. Executing steps 1139 to 1141 completes the records of the status management table 15 corresponding to the subject. When a record with a matching user ID/password is not found (NO in step 1133), when the authority field of the authority management table 13 is not an "administrator" (NO in step 1134), or when log-out information is received from the requester client 2 (YES in step 1136), processing ends.

Figure 12A:
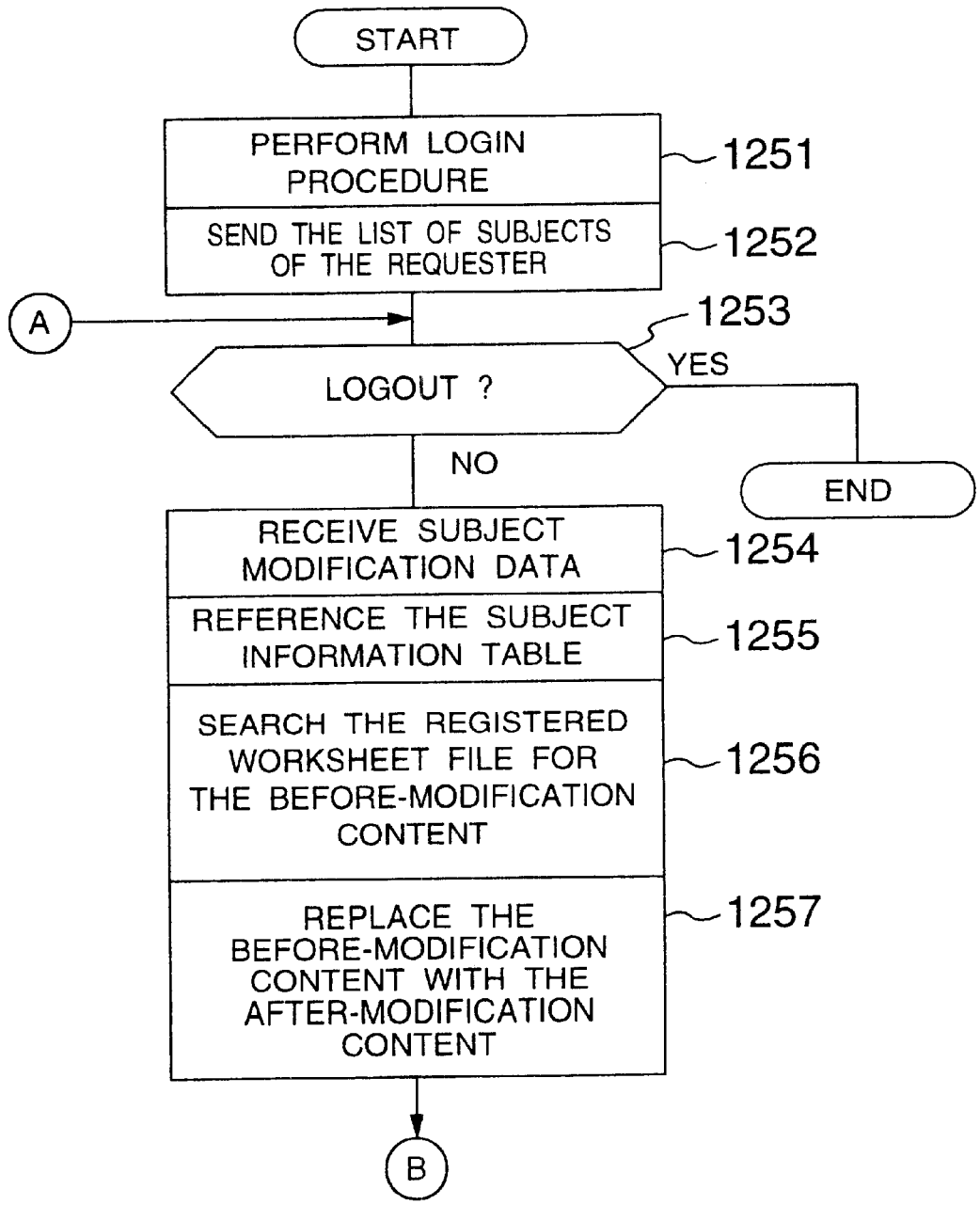
FIG. 12a is a flowchart showing the processing flow of a subject modifying module 22 used in the embodiment.
Figure 12B:
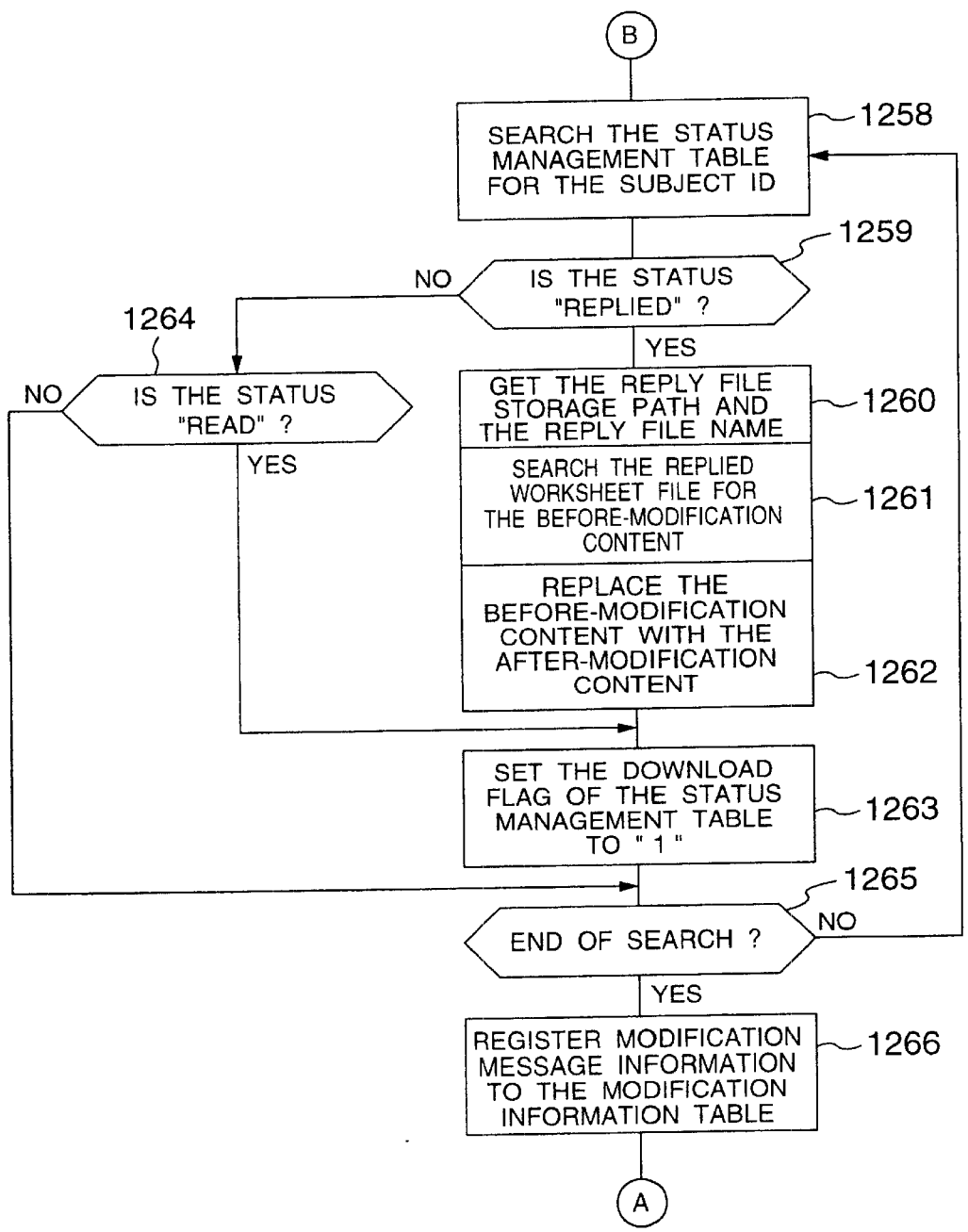
FIG. 12b is a flowchart showing the processing flow of the subject modification module 22 used in the embodiment. (a continuation of FIG. 12a)

FIGS. 12*a* and 12*b* are flowcharts showing the processing of the subject modifying module 22. When a subject modification request is entered from the input unit 125 of the requester client 2, the requester client 2 sends login information to the subject modifying module 22 to log into it. The subject modifying module 22 performs the same login procedure as in steps 1131–1134 (step 1251). When the requester is valid, the module searches the subject information table 14 for the "creator name" of the requester, extracts only the subjects defined by the requester, creates the defined subject list, and sends it to the requester client 2 (step 1252). The requester client 2 displays the registered subject list screen 700 on the display 124. That is, the requester client 2 displays the subject title 701, reply deadline 702, and the worksheet file name 703 for each subject. When the requester presses the "Modify" button 704 with a subject selected, the requester client 2 opens the worksheet content modification screen 800 for the selected worksheet and waits for the requester to enter subject modification data. When the requester enters data into the before-modification content entry area 802, the after-modification content entry area 803, and the message entry area 804 and presses the "Register" button 805, the requester client 2 modifies the worksheet file on the storage unit 121 and then sends the subject modification data, including the subject ID and the subject title, to the subject management server 1.

The subject modifying module 22 receives subject modification data through the before-modification content entry area 802 and the after-modification content entry area 803 (step 1254), searches the subject information table 14 for the subject ID, worksheet file name, and creator name (step 1255), and gets the worksheet storage path 304. Then, the subject modifying module 22 searches the registration worksheet file 11, corresponding to the worksheet storage path and the worksheet file name, for the before-modification content (step 1256), and replaces the before-modification content in the file with the after-modification content (step 1257). To ensure consistency in modifying the replied worksheets which will be described later, the whole worksheet before modification is not replaced with the whole worksheet after modification.

Next, FIG. 12b is described. The subject modifying module 22 searches the status management table 15 for a corresponding record using the subject ID as the key (step 1258). If the status of the record is "replied" (YES in step 1259), the subject modifying module 22 gets the reply file storage path and the reply file name from the record (step 1260) and searches the replied worksheet file 12 for the before-modification content (step 1261). The module then replaces the before-modification content with the after-modification content in the replied worksheet (step 1262) and sets the download flag of the record to "1" (step 1263). As the result of the update processing of the replied worksheet file 12 in step 1262, only a replier's reply at the modification part of the record is left blank with the other parts remaining unchanged. When the status is not "replied" (NO in step 1259) and "read" (YES in step 1264), control is passed directly to step 1263. When the status is not "read" ("unread") (NO in step 1264), control is passed to step 1265. Then, the module checks if the search has ended, that is, if the end of the status management table 15 is reached (step 1265). If the search has not yet ended (NO in step 1265), the module passes control back to step 1258 and searches the status management table 15 for the next record. When the search of the status management table 15 has ended (YES in step 1265), the module registers a record containing the subject ID, the subject title, and the message content to the modification information table 16 (step 1266). Then, the module passes control to step 1253 and repeats the above processing until it receives a log-out request from the requester client 2 (YES in step 1253).

Figure 13:
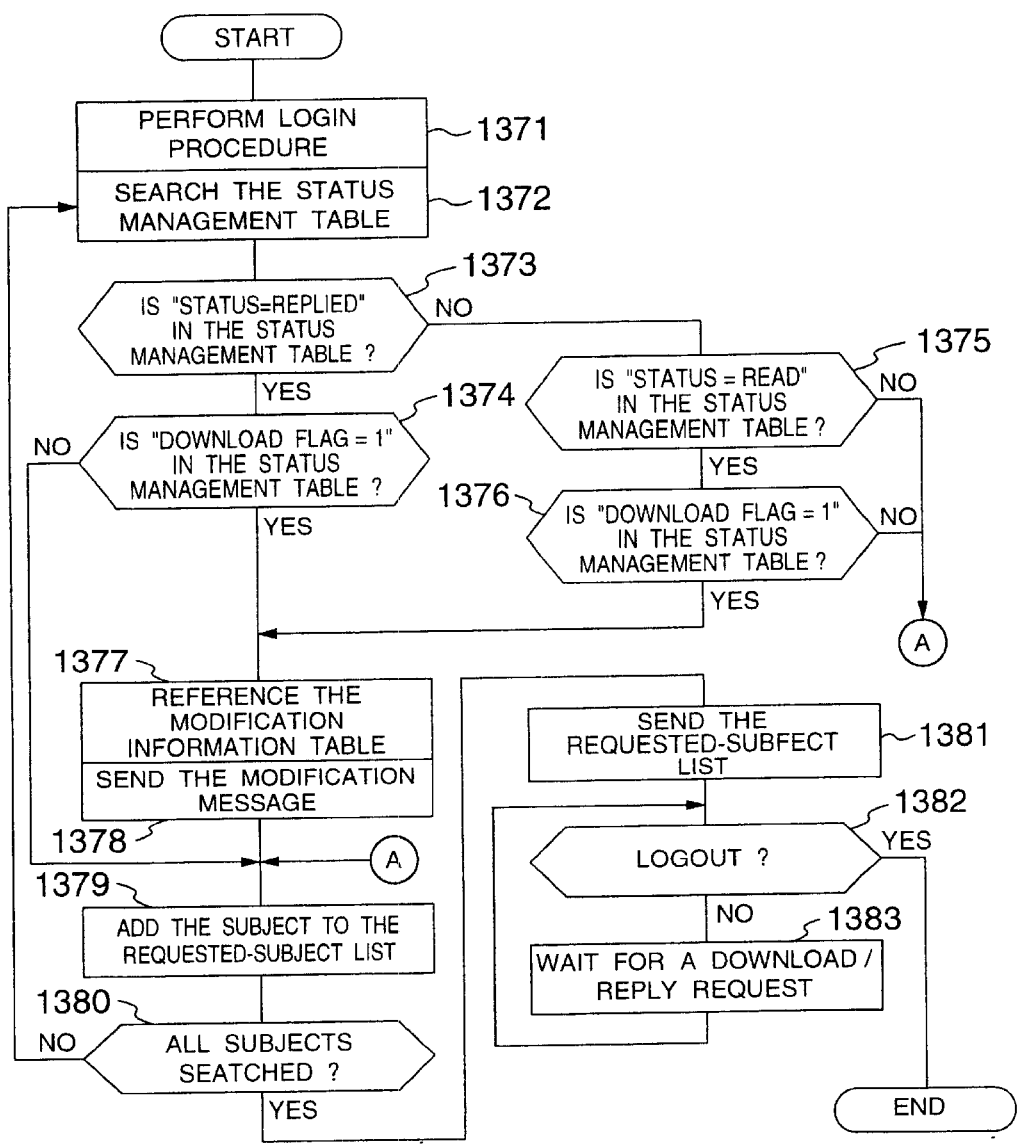
FIG. 13 is a flowchart showing the processing flow of a reply managing module 23 used in the embodiment.

FIG. 13 is a flowchart showing the processing flow of the reply managing module 23. Upon receiving a requested-subject display request from the input unit 135 of the replier client 3, the replier client 3 sends the login information to the reply managing module 23 to log into it. The reply managing module 23 performs the login procedure as in steps 1131–1133 (step 1371). If the replier is valid, the reply managing module 23 searches the status management table 15 for the user ID (that is, replier ID) to get a corresponding record (step 1372). When the status field of the record is "replied" (YES in step 1373) and the download flag of the record is "1" (YES in step 1374), the module searches the modification information table 16 for the subject ID of the record (step 1377) and sends the obtained modification message to the replier client 3 (step 1378). The replier client 3 opens the modification message window on the display 134 and displays the modification message there. Then, the reply managing module 23 searches the subject information table 14 for the subject ID and gets the reply deadline 303, worksheet file name 305, and creator name 306. The module creates a requested-subject record containing the subject ID with the status and the download flag information added from the record in the status management table 15, and registers the created requested-subject record to the requested-subject list (step 1379). When the status field of the record in the status management table 15 is not "replied" (NO in step 1373) but "read" (YES in step 1375) and when the download flag is "1" (YES in step 1376), the module passes control to step 1377. When the status field of the record in the status management table 15 is "replied" and the download flag is "0" (NO in step 1374), when the status field is "unread" (NO in step 1375), or when the status field is "read" and the download flag is "0" (NO in step 1376), the module passes control directly to step 1379. The module then checks if the search has been ended and the end of the status management table 15 has been reached (all the subjects of the requester have been listed) (step 1380).

If not (NO in step 1380), the module passes control back to step 1372 and searches the status management table 15 for the next record. When the search of the status management table 15 has been ended (YES in step 1380), the module sends the created requested-subject list to the replier client 3 (step 1381). The replier client 3 displays the received requested-subject list on the display 134. Then, the reply managing module 23 waits for the replier client 3 to make a download or reply request (step 1383) until it receives a log-out request (YES in step 1382).

Figure 14:
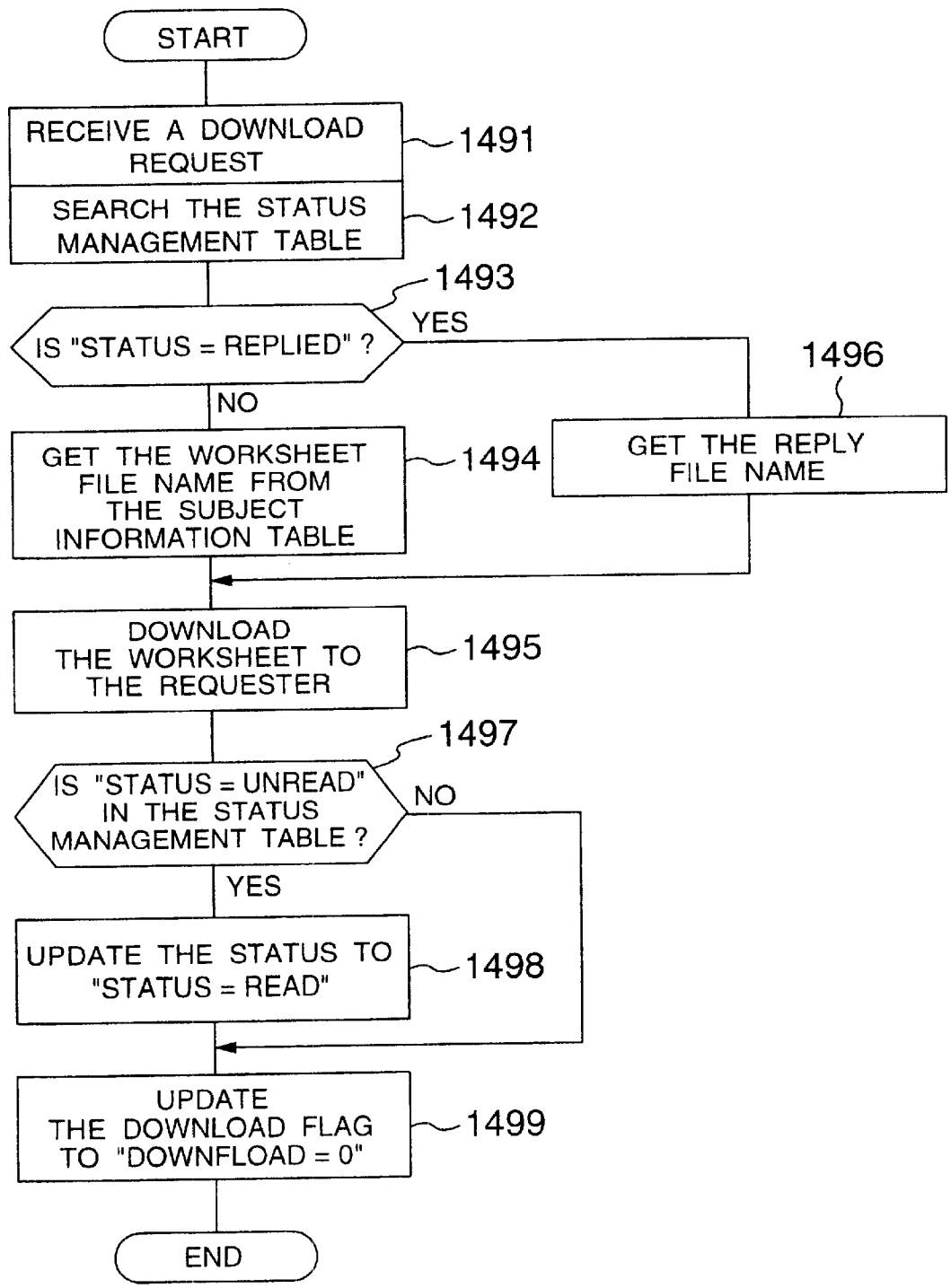
FIG. 14 is a flowchart showing how the reply managing module 23 used in the embodiment downloads subjects.

FIG. 14, is a flowchart showing how the reply managing module 23 downloads the contents of a subject. Upon receiving a download request from the input unit 135, the replier client 3 sends the subject ID to the subject management server 1 to make-a download request. When the reply managing module 23 receives this download request (step 1491), it searches the status management table 15 for the subject ID and the user ID (replier ID) to get a corresponding record (step 1492). When the status field of the record is not "replied" (NO in step 1493), the module searches the subject information table 14 for the subject ID to get the worksheet storage path within the subject management server 1 and the worksheet file name (step 1494). The module then downloads the content of the corresponding definition worksheet file 11 onto the replier client 3 (step 1495). The replier client 3 stores this worksheet file on the storage unit 131 under the specified worksheet file name and displays it on the display 134. When the status field of the record is "replied" (YES in step 1493), the module gets the reply file storage path within the subject management server 1 and the reply file name from the record(step 1496) and executes step 1495 to download the content of the replied worksheet file 12 onto the replier client 3. Note that the worksheet file name attached to this worksheet file is the original worksheet file name generated from the reply file storage path and the reply file name (worksheet file name of the subject stored in the subject information table 14). When the status field of the record is "unread" (YES in step 1497), the module updates the status field to "read" (step 1498) and updates the download flag to 0 (step 1499). When the status field is not "unread" (NO in step 1497), the module passes control directly to step 1499.

Figure 15:
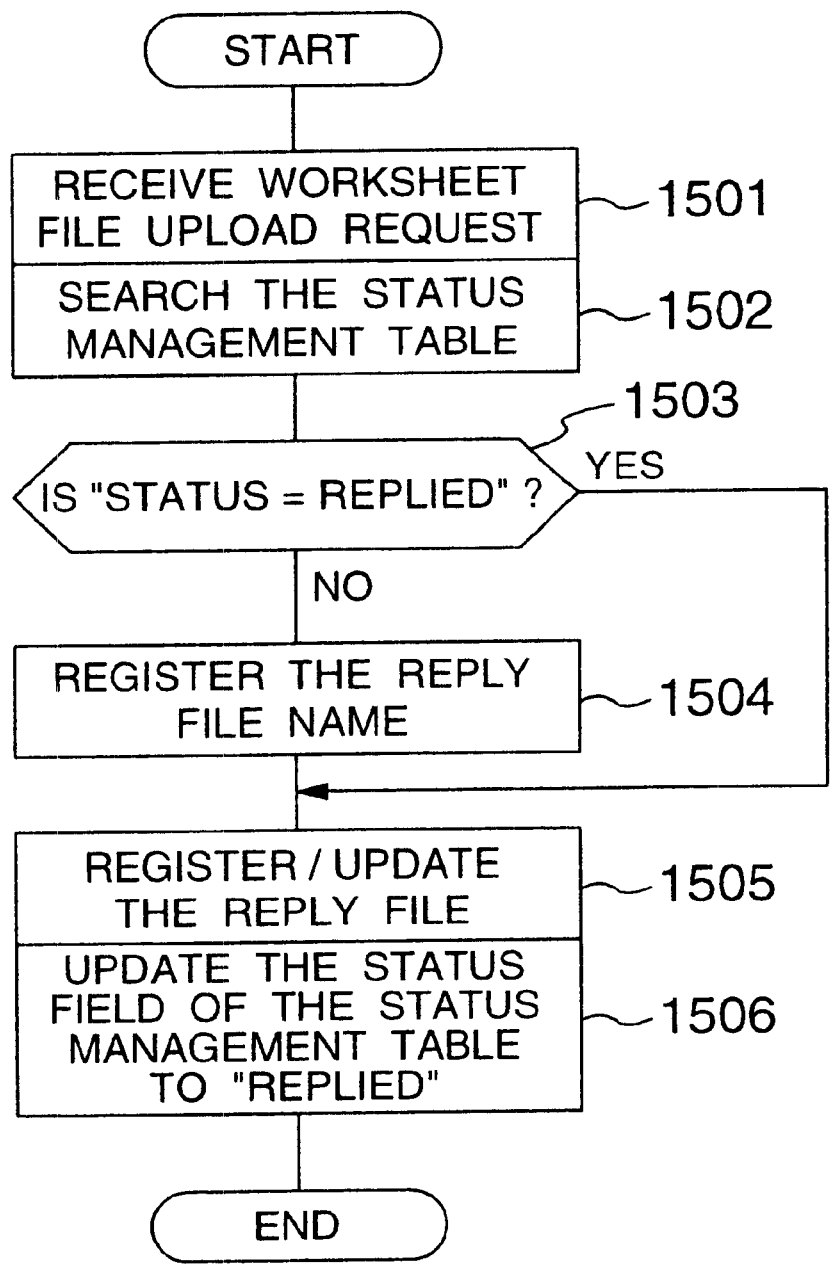
FIG. 15 is a flowchart showing how the reply managing module 23 registers replies.

FIG. 15 is a flowchart showing how the reply managing module 23 registers a reply. Upon receiving a reply register request from the input unit 5, the replier client 3 sends the subject ID and the replied worksheet to the subject management server 1. When the reply managing module 23 receives this reply register request (step 1501), it searches the status management table 15 for the subject ID and the user ID (replier ID) to get a corresponding record (step 1502). When the status field of the record is not "replied" (NO in step 1503), this reply is the first reply. In this case, the module searches the subject information table 14 for the subject ID to get the worksheet file name from the corresponding record, generates the reply file storage path and the reply file name from this worksheet file name and the user ID, registers the generated reply file name to the status management table 15 (step 1504), and adds a new replied worksheet file 12 (step 1505). When the status field is "replied" (YES in step 1503), the reply file storage path and the reply file name have already been stored. Thus, in this case, the module updates the file by overwriting the existing file (step 1505). Lastly, the module updates the status field of the status management table 15 to "replied" (step 1506). Note that the replier may reply to the same worksheet any number of times.

A requester at the requester client 2 may issue a request to a subject referencing module, not shown in the figure, in the subject management server 1 to get the list of registered subjects and, from the list, a subject according to the procedure described above. This allows the requester to reference the status of the replier stored in the status management table 15 and the replied worksheet file 12 of the replier who has already replied.

In the above embodiment, a question contained in a questionnaire is modified on the worksheet content modification screen 800 shown in FIG. 8. However, the present invention applies not only to the modification of the content of a questionnaire but also to the modification of calculation formulas in a spreadsheet created with a spreadsheet software product.

FIG. 16 shows an example of a screen on which the requester client 2 is creating such a spreadsheet 1600. In FIG. 16, the requester has entered three items in the item cells (1601) with a desired quantity in each quantity item cell 1603 (The file name is estimate.els). In FIG. 16, the symbols "A", "B", "C", and "D" expressed on a label row and "1", "2", "3", and "4" expressed on a label column are coordinate symbols used to specify each cell.

The requester client 2 registers this estimate sheet 1600 to the subject management server 1, which sends the sheet to a plurality of replier clients 3. Each replier fills in the unit-price cell 1602 of the estimate sheet 1600 using the same spreadsheet program as the one used by the requester. As the replier fills in the unit-price cell, the replier client 3 automatically calculates the values to be entered into the amount cell 1604 and the total cell 1605 according to the calculation formulas. The replier client 3 sends the estimate sheet 1600 filled in by the replier to the subject management server 1. The subject management server 1 sends the replied estimates, received from the replier clients 3, to the requester client 2.

The processing flows as described above. Now, assume that the requester finds an error in the formula specified in the total cell 1605 in the estimate sheet 1600 after the requester has added the estimate sheet 1600 to the subject management server 1. In this case, the requester opens a worksheet content modification screen 1700, shown in FIG. 17, on the display 124 of the requester client 2 and modifies the incorrect formula "D5=D2+C3+D4" in the total cell 1605, shown in 1701, to the correct formula "D5=D2+D3+D4" shown in 1702. At the same time, the requester fills in the message area with a modification message 1703 and presses a "Register" button 1704.

When a formula correction or modification is received from the requester client 2, the subject management server 1 modifies the formula in the total cell in the estimate sheet sent from the requester and the formula in the total cell in the replied estimate sheet sent from one or more repliers. At the same time, when a download request is received from a replier who has already replied or from a replier who has downloaded the estimate sheet but has not yet replied, the subject management server 1 sends to the replier the modification message indicating that the formula is incorrect. This processing procedure is derived easily from FIGS. 12a and 12b.

In the above embodiment, the status of the reply flag indicating whether the replier has replied is in one of the three: "unread", "read", and "replied". And, the status of the download flag indicating whether the replier has downloaded the worksheet is in one of the two: "not downloaded" and "download". These two flags are combined in the embodiment to identify the replier's reply status and the worksheet modification status. Other flags may also be combined, or one flag may be used, to identify the status.

What is claimed is:

1. A method for re-distributing and collecting modified electronic worksheets after distribution of unmodified electronic worksheets, wherein an electronic worksheet, created and stored in first storage means by a requester, is distributed to a plurality of repliers, replied worksheets filled in by said repliers are stored in second storage means for reference by said requester, and said method comprises the steps of:

modifying a part of an unmodified electronic worksheet stored in said first storage means in response to a modification request from said requester, to create a modified electronic worksheet;

modifying each of said replied worksheets stored in said second storage means at a part corresponding to said part modified by said requester based on status information indicating whether or not each of said repliers have replied to said unmodified worksheet, said status information being stored in third storage means; and re-distributing said replied worksheet thus modified and stored in said second storage means to respective repliers who have replied, while re-distributing said modified worksheets stored in said first storage means to repliers who have not replied, based on said status information.

2. The method according to claim 1, further comprising the step of changing the status information of each of said repliers who have replied to said unmodified worksheets to an unread status, when re-distributing said replied worksheets thus modified.

3. The method according to claim 1, wherein information already filled in by said repliers at the modified part of said replied worksheets thus modified are unfilled, while information at the other part remains unchanged, when said replied worksheets thus modified are re-distributed.

4. A computer program product stored on a computer-readable storage medium for re-distributing and collecting modified electronic worksheets after distribution of unmodified electronic worksheets, wherein the electronic worksheet, created and stored in first storage means by a requester, is distributed to a plurality of repliers, replied worksheets filled in by said repliers are stored in second storage means for reference by said requester, and said program comprises the steps of:

(a) modifying a part of an unmodified electronic worksheet stored in said first storage means in response to a modification request from said requester, to create a modified electronic worksheet;

(b) modifying each of said replied worksheets stored in said second storage means at a part corresponding to said part modified by said requester based on status information indicating whether or not each of said repliers have replied to said unmodified worksheet, said status information being stored in third storage means; and (c) re-distributing said replied worksheets thus modified and stored in said second storage means to respective repliers who have replied, while redistributing said modified worksheets stored in said first storage means to repliers who have not replied, based on said status information.

5. The computer program product according to claim 4, further comprising the steps of:

distributing the electronic worksheet by downloading onto a terminal of a replier; and collecting replied worksheets by uploading from terminals of said repliers.

6. The computer program product according to claim 4, wherein said status information on each of said repliers indicates whether a corresponding electronic worksheet is in an unread, read, or replied status and whether the corresponding electronic worksheet has been downloaded (downloaded status/not-downloaded status), and said program further comprises the steps of:

when the corresponding electronic worksheet is downloaded, changing the download status of the replier to the downloaded status and changing the electronic worksheet status to the read status if the status is the unread status;

changing the electronic worksheet status from the read status to the replied status when the replier replies to the corresponding electronic worksheet; and changing the download status of all associated repliers to the not-downloaded status when the corresponding electronic worksheet is modified regardless of whether the status is the unread, read, or replied status.

7. The computer program product according to claim 4, further comprising the step of, after an electronic worksheet is modified, sending an electronic worksheet modification message to a replier whose status is the replied status when the replier accesses a server for distributing the electronic worksheet.

8. The computer program product according to claim 4, wherein said program further comprises the step of changing said status information of each of said repliers who have replied to said unmodified worksheets to be an unread status, when re-distributing said replied worksheets thus modified.

9. The computer program product according to claim 4, wherein information already filled in by said repliers at the modified part of said replied worksheets thus modified are unfilled, while information at the other part remains unchanged, when said replied worksheets thus modified are re-distributed.

10. An electronic worksheet management server comprising:

a worksheet defining module for registering an unmodified electronic worksheet, sent from a requester client via a network, in a first storage area;

a reply management module for allowing a plurality of replier clients to download said unmodified electronic worksheet via said network and for collecting replied worksheets from said replier clients and storing said replied worksheets in a second storage area; and a worksheet modifying module for carrying out a modification requested by said requester client onto said unmodified worksheet in response to a modification request from said requester client to create a modified worksheet, modifying each of said replied worksheets by overwriting said modification onto each of said replied electronic worksheets, and re-distributing said replied worksheets thus modified to respective repliers who have replied, while re-distributing said modified worksheets to repliers who have not replied.

11. The electronic worksheet management server according to claim 10 wherein, when a replier client accesses said management server via said network after downloading said unmodified worksheet, said worksheet modifying module sends a modification message to the accessing replier client, said modification message indicating that there is a modification to said electronic worksheet.

12. The electronic worksheet management server according to claim 11, wherein said modification is on a content described on said unmodified electronic worksheet.

13. The electronic worksheet management server according to claim 12, wherein said modification includes a modification on a calculation formula created by said requester client to introduce the content contained in said electronic worksheet.

14. The electronic worksheet management server according to claim 10, wherein information already filled in by said repliers at a part of said modification of said replied worksheets thus modified are unfilled, while information at the other part remains unchanged, when said replied worksheets thus modified are re-distributed.

15. A method for re-distributing and collecting electronic worksheets for use in an electronic worksheet management server connected to a requester client and a plurality of replier clients over a network, said method comprising the steps of:

registering an unmodified electronic worksheet sent from said requester client via said network;

allowing said plurality of replier clients to download said unmodified electronic worksheet via said network and collecting replied electronic worksheets from said replier clients;

carrying out a modification requested by said requester client onto said unmodified worksheet in response to a modification request from said requester client to create a modified worksheet, and modifying each of said replied worksheets by overwriting said modification onto said replied electronic worksheets; and re-distributing said replied worksheets thus modified to respective repliers who have replied, while re-distributing said modified worksheets to repliers who have not yet replied.

16. The method for re-distributing and collecting electronic worksheets according to claim 15, further comprising the step of, when a replier client accesses said management server via said network after downloading said unmodified worksheet, sending a modification message to the accessing replier client, said modification message indicating that there is a modification to said electronic worksheet.

17. The method for re-distributing and collecting electronic worksheets according to claim 15, wherein information already filled in by said repliers at a part of said modification of said replied worksheets thus modified are unfilled, while information at the other part remains unchanged, when said replied worksheets thus modified are re-distributed.

18. A computer program product for use in a system where an electronic worksheet management server, a requester client, and a plurality of replier clients are connected via a network, said program product causing a computer in said electronic worksheet management server to:

> register an unmodified electronic worksheet sent from a requester client via said network;
>
> allow said plurality of replier clients to download said unmodified electronic worksheet via said network and collect replied electronic worksheets from said replier clients;
>
> carry out a modification requested by said requester client onto said unmodified worksheet in response to a modification request from said requester client to create a modified worksheet, and modifying each of said replied worksheets by overwriting said modification onto said replied electronic worksheets; and
>
> re-distributing said replied worksheets thus modified to respective repliers who have replied, while re-distributing said modified worksheets to repliers who have not replied.

19. The computer program product according to claim 18 wherein, when a replier client accesses said management server via said network after downloading said unmodified worksheet, said computer program further causes the computer to send a modification message to the accessing replier client, said modification message indicating that there is a modification to said electronic worksheet.

20. A method for re-distributing and collecting electronic worksheets in a system constituted by an electronic worksheet management server, a requester client and plurality of replier clients, comprising the steps of:

> registering an unmodified electronic sheet sent from a requester client in said electronic worksheet management server;
>
> downloading, by replier clients, said unmodified electronic worksheet, and collecting, by said management server, replied electronic worksheets from said replier clients;
>
> carrying out, by said management server, a modification requested by said requester client onto said unmodified worksheet in response to a modification request from said requester client to create a modified worksheet, and modifying each of said replied worksheets by overwriting said modification onto said replied electronic worksheets collected in said management server; and
>
> re-distributing, by said management server, said replied worksheets thus modified to respective repliers who have replied, while re-distributing said modified worksheets to repliers who have not replied.

* * * * *